US012140984B2

(12) United States Patent
Konishi et al.

(10) Patent No.: US 12,140,984 B2
(45) Date of Patent: Nov. 12, 2024

(54) POWER SUPPLY CIRCUIT AND TRANSMITTING DEVICE

(71) Applicant: SONY SEMICONDUCTOR SOLUTIONS CORPORATION, Kanagawa (JP)

(72) Inventors: Hironobu Konishi, Kanagawa (JP); Toshio Suzuki, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 695 days.

(21) Appl. No.: 17/281,397

(22) PCT Filed: Aug. 6, 2019

(86) PCT No.: PCT/JP2019/030810
§ 371 (c)(1),
(2) Date: Mar. 30, 2021

(87) PCT Pub. No.: WO2020/075376
PCT Pub. Date: Apr. 16, 2020

(65) Prior Publication Data

US 2022/0043472 A1 Feb. 10, 2022

(30) Foreign Application Priority Data

Oct. 10, 2018 (JP) ................................ 2018-191759

(51) Int. Cl.
*G05F 1/10* (2006.01)
*G05F 1/575* (2006.01)

(52) U.S. Cl.
CPC .................................. *G05F 1/575* (2013.01)

(58) Field of Classification Search
CPC .................................. G05F 1/575; G05F 1/56
See application file for complete search history.

(56) References Cited

U.S. PATENT DOCUMENTS 4,431,970 A * 2/1984 Sumi ........................ H03D 3/22 329/336
2006/0043945 A1 3/2006 Sohn
(Continued)

FOREIGN PATENT DOCUMENTS

CN 102438109 A 5/2012
CN 103149962 A 6/2013
(Continued)

OTHER PUBLICATIONS

International Search Report and Written Opinion of PCT Application No. PCT/JP2019/030810, issued on Oct. 29, 2019, 09 pages of ISRWO.

*Primary Examiner* — Jue Zhang
*Assistant Examiner* — Afework S Demisse
(74) *Attorney, Agent, or Firm* — CHIP LAW GROUP

(57) ABSTRACT

Provided are a power supply circuit and a transmitting device that can achieve lowering of power supply voltage. Provided is a power supply circuit including a current feedback unit, in which the current feedback unit has two p-type MOS transistors, a control element, and a first resistor, the two p-type MOS transistors and the control element configure a current turnback circuit that turns back the current, current substantially the same as the reference current in the circuit flows through the control element and the first resistor, and the output voltage is determined at least depending on the first resistor and the reference current.

12 Claims, 13 Drawing Sheets

(56) References Cited

U.S. PATENT DOCUMENTS

| | | | | |
|---|---|---|---|---|
| 2010/0052635 | A1* | 3/2010 | Wang | G05F 1/575 323/280 |
| 2015/0234404 | A1 | 8/2015 | Agarwal | |
| 2015/0250036 | A1* | 9/2015 | Ueda | H05B 45/375 315/178 |
| 2018/0136679 | A1 | 5/2018 | Ide et al. | |
| 2022/0311339 | A1* | 9/2022 | Yen | H02M 1/0048 |
| 2023/0130733 | A1* | 4/2023 | Zhang | G05F 3/26 323/274 |

FOREIGN PATENT DOCUMENTS

| | | | |
|---|---|---|---|
| CN | 107102665 | A | 8/2017 |
| JP | 2011-250195 | A | 12/2011 |
| JP | 2016-009230 | A | 1/2016 |
| JP | 2016-015076 | A | 1/2016 |
| WO | 2016/190112 | A1 | 12/2016 |

* cited by examiner

POWER SUPPLY CIRCUIT AND TRANSMITTING DEVICE

CROSS REFERENCE TO RELATED APPLICATIONS

This application is a U.S. National Phase of International Patent Application No. PCT/JP2019/030810 filed on Aug. 6, 2019, which claims priority benefit of Japanese Patent Application No. JP 2018-191759 filed in the Japan Patent Office on Oct. 10, 2018. Each of the above-referenced applications is hereby incorporated herein by reference in its entirety.

TECHNICAL FIELD

The present technology relates to a power supply circuit and a transmitting device, and particularly to a power supply circuit to which a current feedback type low drop out (LDO) regulator is applied.

BACKGROUND ART

A low drop out (LDO) regulator that can operate with an extremely small difference between an input voltage and an output voltage in a power supply circuit is known.

The high-speed interface (IF) standard defines the differential output voltage or the common voltage of output signals. For example, the MIPI D-PHY standard as a chip-to-chip interface for mobile phones, and the SLVS-EC standard for high-speed serial interfaces to be mounted on CMOS image sensors stipulate that the common voltage of differential signals is 0.2 V. Therefore, 0.4 V is required for a power supply for a differential driver. Furthermore, in the case of the MIPI C-PHY standard, 0.45 V is required.

As a power supply for this differential driver, it is necessary to apply voltage from the outside or to mount a power supply circuit (regulator) inside the chip. Then, in a case where a regulator is mounted in a chip, the differential driver is desired to have large load current and low power consumption, and therefore a low drop out (LDO) regulator is used (e.g., Patent Document 1).

CITATION LIST

Patent Document

Patent Document 1: International Publication WO 2016/190112

SUMMARY OF THE INVENTION

Problems to be Solved by the Invention

As a low drop out (LDO) regulator, a voltage feedback type LDO regulator is conventionally known. In the case of a voltage feedback type LDO regulator, a transistor is generally configured with multiple stages (e.g., four stages) between the power supply and Gnd, and therefore lowering of power supply voltage cannot be achieved.

The present technology has been made in view of such a situation, and a main object thereof is to provide a power supply circuit and a transmitting device that can achieve lowering of power supply voltage.

Solutions to Problems

As a result of diligent research to solve the above object, the present inventors have succeeded in achieving lowering of power supply voltage, and have completed the present technology.

That is, the present technology first provides a power supply circuit including a current feedback unit,

- in which the current feedback unit has two p-type MOS transistors, a control element, and a first resistor,
- the two p-type MOS transistors and the control element configure a current turnback circuit that turns back the current,
- current substantially the same as the reference current in the circuit flows through the control element and the first resistor, and the output voltage is determined at least depending on the first resistor and the reference current.

In a power supply circuit according to the present technology, the output voltage value may be calculated at least from the product of the resistance value of the first resistor and the current value of the reference current.

In a power supply circuit according to the present technology, the output voltage may satisfy the following Expression (1), where the reference current is denoted by Iref, the gate-source voltage of the control element is denoted by Vgs, the first resistor is denoted by R1, and the input voltage to the control element is denoted by Vref.

[Expression 1]

$$Vout = Vref - Vgs + Iref \times R1 \tag{1}$$

In a power supply circuit according to the present technology,

- a bias generating unit may be provided,
- the control element may be configured with an n-type MOS transistor,
- the bias generating unit may have an element substantially the same as the control element, and a second resistor, and
- the output voltage may satisfy the following Expression (2), where the second resistor is denoted by R2, and the input voltage Vref is expressed as Iref×R2+Vgs.

[Expression 2]

$$Vout = Iref \times (R1 + R2) \tag{2}$$

In a power supply circuit according to the present technology, at least one of the first resistor or the second resistor may be configured with a variable resistor.

In a power supply circuit according to the present technology, current that flows through the control element may flow through the first resistor.

In a power supply circuit according to the present technology, the output voltage may be determined from the resistance value of the second resistor in a case where the resistance value of the first resistor is extremely smaller than the resistance value of the second resistor.

In a power supply circuit according to the present technology, the bias generating unit may further include a copy source current source, and current of the copy source current source may serve as the reference current.

A power supply circuit according to the present technology may have at least two first resistors, and have at least two output voltages depending on the positions of the respective first resistors.

In a power supply circuit according to the present technology, the current feedback unit may further have a differential circuit.

Furthermore, the present technology provides a transmitting device, in which a power supply circuit is installed, the power supply circuit includes a current feedback unit, the current feedback unit has two p-type MOS transistors, a control element, and a first resistor, the two p-type MOS transistors and the control element configure a current turnback circuit that turns back the current, current substantially the same as the reference current in the circuit flows through the control element and the first resistor, and the output voltage is determined at least depending on the first resistor and the reference current.

A transmitting device according to the present technology may be a transmitting device in which a power supply circuit described in any one of the above is installed.

It is possible with the present technology to provide a power supply circuit and a transmitting device that can achieve lowering of power supply voltage. Note that effects of the present technology are not necessarily limited to the effects described above, and may be any effect described in the present technology.

MODE FOR CARRYING OUT THE INVENTION

The following description will explain preferred modes for carrying out the present technology with reference to the drawings. Note that the embodiments described below are to illustrate an example of typical embodiments of the present technology, and not to narrow the interpretation of the scope of the present technology.

Note that description will be given in the following order.

1. Outline of present technology
2. First embodiment (Example 1 of power supply circuit)
3. Second embodiment (Example 2 of power supply circuit)
4. Third embodiment (Example 3 of power supply circuit)
5. Fourth embodiment (Example 4 of power supply circuit)
6. Fifth embodiment (Example 5 of power supply circuit)
7. Sixth embodiment (Example 6 of power supply circuit)
8. Seventh embodiment (Example 7 of power supply circuit)
9. Eighth embodiment (transmitting device)

1. Outline of Present Technology

First, the outline of the present technology will be described. The present technology relates to the configuration of a low drop out (LDO) regulator that supplies power to a differential driver of a high-speed IF standard (e.g., MIPI or SLVS-EC). The present technology is to achieve lowering of the voltage of a low drop out (LDO) regulator that supplies power to a high-speed IF differential driver, and to reduce the power of a transmitting device.

Figure 9:
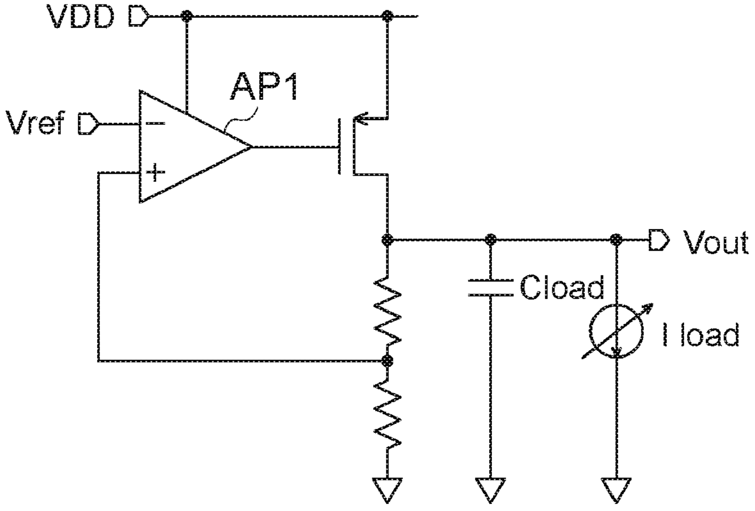
FIG. 9 is an explanatory diagram illustrating the configuration of a conventional voltage feedback type LDO regulator.

Conventionally, a voltage feedback type LDO regulator is generally known as an LDO regulator. FIG. 9 illustrates the configuration of a conventional voltage feedback type LDO regulator. FIG. 9 is an explanatory diagram illustrating the configuration of a conventional voltage feedback type LDO regulator. The voltage feedback type LDO regulator illustrated in FIG. 9 is a voltage feedback type LDO regulator disclosed in FIG. 1 of International Publication WO 2016/190112, in which a voltage feedback amplifier AP1 is used.

Figure 10:
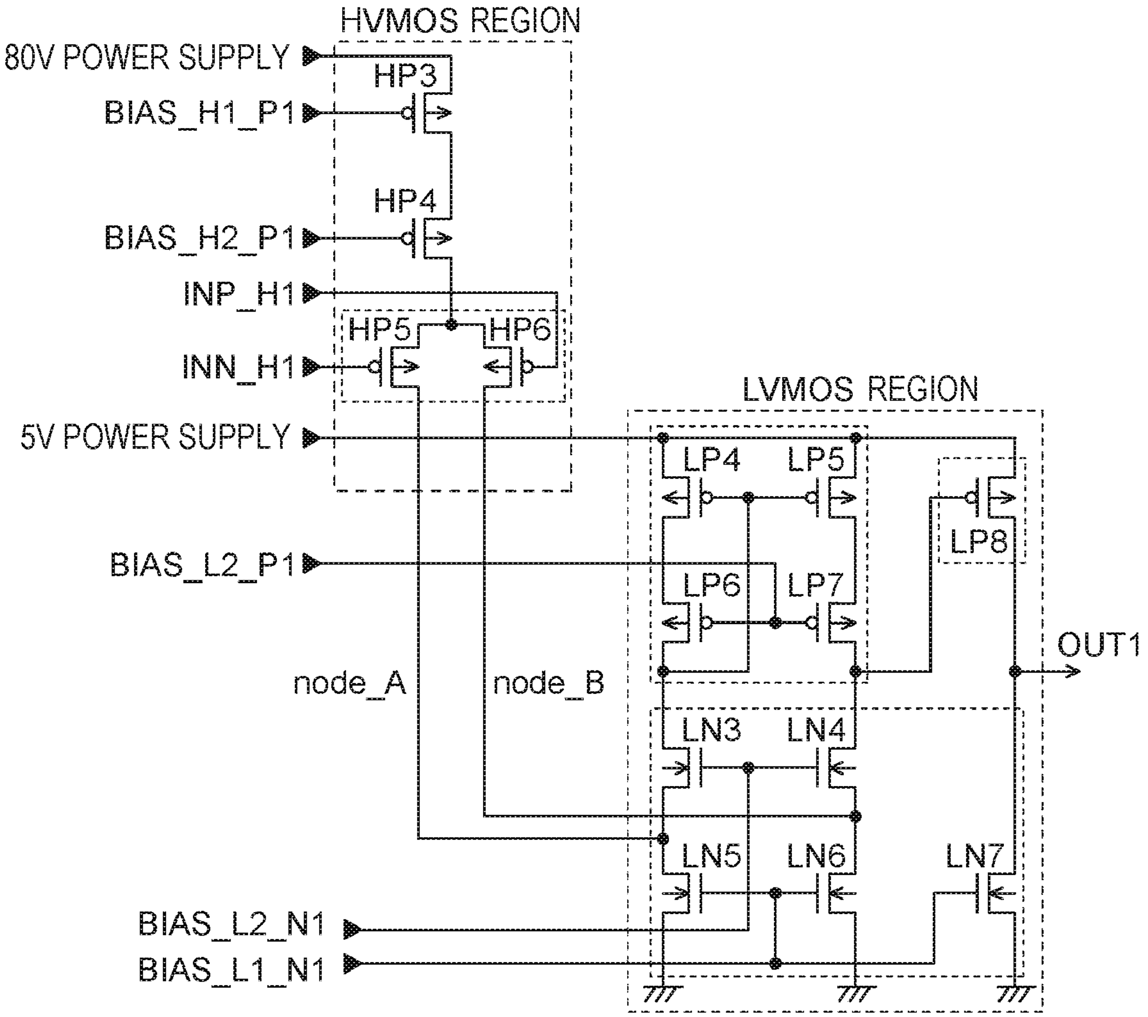
FIG. 10 is an explanatory diagram illustrating a generally used fall cascode amplifier.

Furthermore, FIG. 10 illustrates a folded cascode amplifier that is generally used as a voltage feedback amplifier. The folded cascode amplifier illustrated in FIG. 10 is a differential amplifier disclosed in FIG. 4 of Japanese Patent Application Laid-Open No. 2011-250195. In the case of a fall cascode amplifier that uses a p-type MOS transistor as an input, transistors are vertically stacked in four or three stages between the power supply of the folded cascode circuit and Gnd. Therefore, "gate-source voltage Vgs+overdrive voltage Vod×2" is required to allow the folded cascode circuit to operate in a stable transistor saturation region. Note that the overdrive voltage Vod means a voltage obtained by subtracting the threshold voltage Vth from the gate-source voltage Vgs. That is, the overdrive voltage Vod is an index indicating how much the gate-source voltage Vgs exceeds the threshold voltage Vth.

Figure 11:
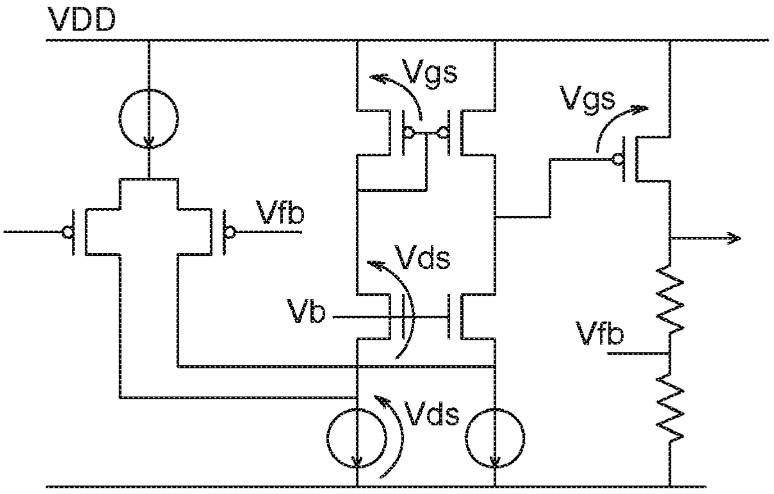
FIG. 11 is an explanatory diagram illustrating a fall cascode amplifier.

FIG. 11 illustrates a folded cascode amplifier that uses a p-type MOS transistor as an input. FIG. 11 is an explanatory diagram illustrating a folded cascode amplifier that uses a p-type MOS transistor as an input.

In the case of FIG. 11, for example, when the gate-source voltage Vgs is 600 mV and the overdrive voltage Vod is 150 mV, the lower limit power supply voltage is limited to approximately 900 mV (0.9 V), which is 600 mV+150 mV×2.

Figure 12:
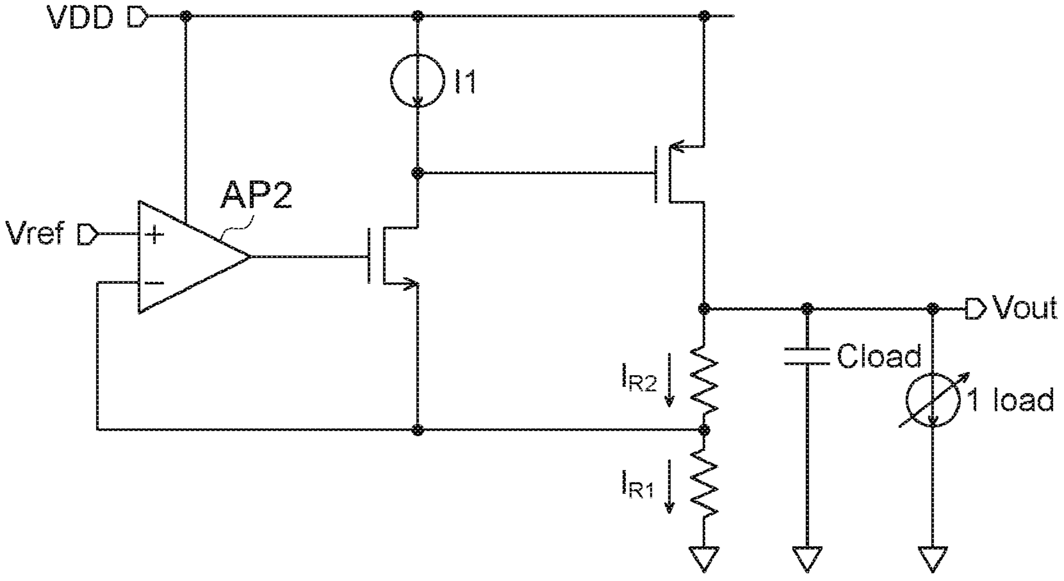
FIG. 12 is an explanatory diagram illustrating the configuration of a current feedback type LDO regulator.

FIG. 12 illustrates the configuration of a current feedback type LDO regulator. FIG. 12 is an explanatory diagram illustrating the configuration of a current feedback type LDO regulator. The current feedback type LDO regulator illustrated in FIG. 12 is a current feedback type LDO regulator disclosed in FIG. 5 of International Publication WO 2016/190112. This current feedback type LDO regulator improves responsiveness to load fluctuation, though the voltage of an amplifier 2 is not lowered. For example, eliminating the amplifier 2 and operating the LDO using only the current feedback circuit will be discussed. A configuration diagram in this case is illustrated in FIGS. 13A and 13B.

Figure 13A:
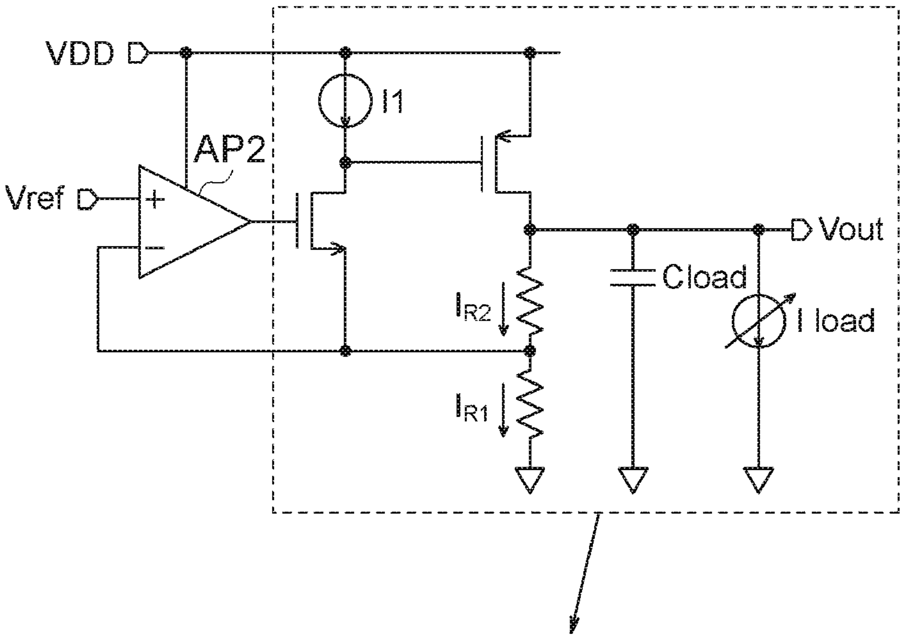
FIGS. 13A and 13B are explanatory diagrams illustrating the configuration of a current feedback type LDO regulator, and an LDO regulator of a current feedback circuit in which an amplifier is eliminated from the current feedback type LDO regulator.
Figure 13B:
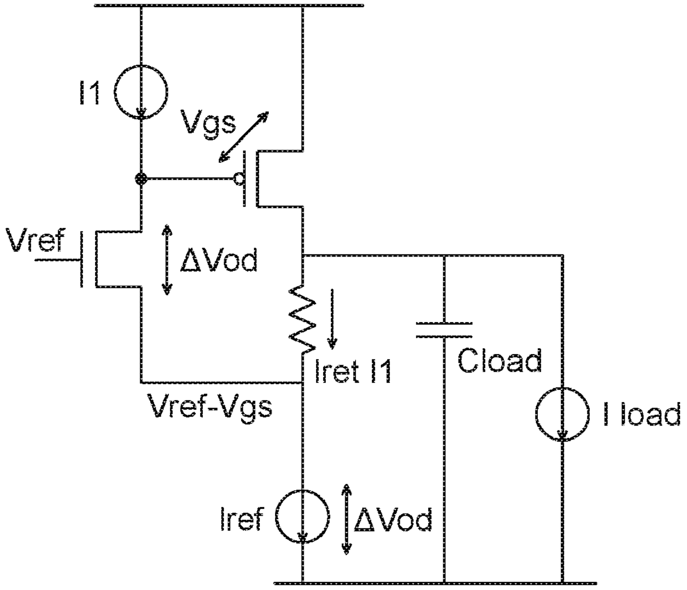

FIGS. 13A and 13B are explanatory diagrams illustrating, in FIG. 13A, the configuration of the current feedback type LDO regulator of FIG. 12, and illustrating, in FIG. 13B, a configuration in which the amplifier 2 is eliminated from the current feedback type LDO regulator of FIG. 12. Even if the amplifier 2 is eliminated from the current feedback type LDO regulator illustrated in FIG. 13A, the lower limit power supply voltage becomes "gate-source voltage Vgs+overdrive voltage Vod×2" as illustrated in FIG. 13B, and therefore lowering of power supply voltage is not achieved.

Furthermore, since variation in Vgs of the n-type MOS transistor is directly reflected in the output voltage of the LDO regulator, there is also a problem that the output voltage varies.

It is possible with the present technology to realize lowering of the voltage of a low drop out regulator that supplies power to a high-speed IF differential driver, and to reduce the power of a transmitting device.

2. First Embodiment (Example 1 of Power Supply Circuit)

A power supply circuit of the first embodiment according to the present technology is a power supply circuit including a current feedback unit, in which the current feedback unit has two p-type MOS transistors, a control element, and a first resistor, the two p-type MOS transistors and the control element configure a current turnback circuit that turns back the current, current substantially the same as the reference current in the circuit flows through the control element and the first resistor, and the output voltage is determined at least depending on the first resistor and the reference current. In the power supply circuit of the first embodiment according to the present technology, the output voltage value is calculated at least from, for example, the product of the resistance value of the first resistor and the current value of the reference current.

In the power supply circuit of the first embodiment according to the present technology, the output voltage satisfies the following Expression (1), where the reference current is denoted by Iref, the gate-source voltage of the control element is denoted by Vgs, the first resistor is denoted by R1, and the input voltage to the control element is denoted by Vref.

[Expression 3]

$$V\text{out}=V\text{ref}-Vgs+I\text{ref}\times R1 \quad (1)$$

It is possible with the power supply circuit of the first embodiment according to the present technology to realize lowering of the voltage of a low drop out (LDO) regulator, and to reduce the power of a transmitting device. Note that the substantially same current includes, for example, the same current value as the reference current Iref, and can be a current value within 95% to 105% of the reference current Iref.

Figure 1:
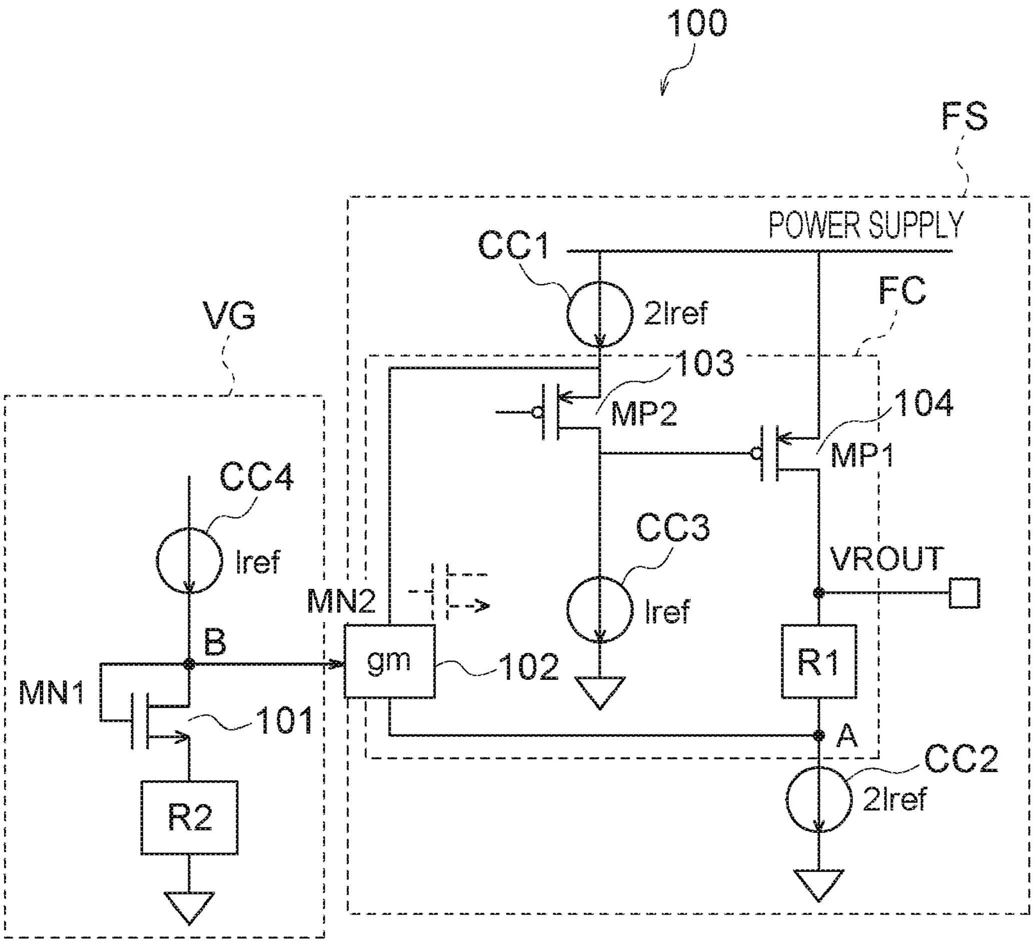
FIG. 1 is a block diagram illustrating an example of the configuration of an LDO regulator that is an example of a power supply circuit of a first embodiment according to the present technology.

FIG. 1 illustrates an LDO regulator 100 that is an example of a power supply circuit of the first embodiment according to the present technology. FIG. 1 is a block diagram illustrating a configuration example of the LDO regulator 100 to which the present technology is applied.

The LDO regulator 100 illustrated in FIG. 1 includes a current feedback unit FS. Moreover, the LDO regulator 100 may include a bias generating unit VG. The bias generating unit VG has a constant current source CC4, an n-type MOS transistor 101, and a second resistor R2.

The current feedback unit FS includes a constant current source CC1, a constant current source CC2, and a current turnback circuit FC. The constant current source CC1 and the constant current source CC2 configure a current mirror circuit. The current turnback circuit FC includes a control element (gm) 102, a p-type MOS transistor (MP2) 103, a p-type MOS transistor (MP1) 104, a first resistor R1, and a constant current source CC3. Note that the control element 102 is configured with an n-type MOS transistor.

Current substantially the same as the reference current in the circuit flows through the control element 102 and the first resistor R1. Here, the output voltage Vout of a VROUT terminal satisfies the following Expression (1), where the reference current is denoted by Iref, the gate-source voltage of the control element 102 is denoted by Vgs, the first resistor is denoted by R1, and the input voltage to the control element 102 is denoted by Vref.

[Expression 4]

$$V\text{out}=V\text{ref}-Vgs+I\text{ref}\times R1 \quad (1)$$

For example, the LDO regulator 100 receives constant current 2Iref as an input of the current feedback unit FS. Current 1Iref of the constant current 2Iref flows through the control element 102, and furthermore, current 1Iref flows through the p-type MOS transistor 103.

At this time, since the gate voltage of the p-type MOS transistor 104 is turned on, current 1Iref flows from the source to the drain of the p-type MOS transistor 104. That is, current 1Iref flows through the first resistor R1.

Therefore, at point A, constant current 2Iref including current 1Iref flowing through the control element 102 and current 1Iref flowing through the first resistor R1 flows. Then, this output current 2Iref is copied so as to be circulated by the current feedback unit FS.

Then, the current is fed back, and the output voltage Vout outputted from the VROUT terminal is "Vref−Vgs+Iref×R1" and is constant.

Here, when the output voltage Vout of the VROUT terminal lowers, the voltage on the side where the first resistor R1 is grounded (i.e., point A) lowers. When the voltage at point A lowers, the voltage of the source of the control element 102 lowers, and the gate-source voltage Vgs of the control element 102 rises. When the gate-source voltage Vgs of the control element 102 rises, current that flows between the drain and the source of the control element 102 increases.

Since constant current 2Iref flows through the constant current source CC1, current that flows between the source and the drain of the p-type MOS transistor 103 decreases. When considering the p-type MOS transistor 103 as a resistor, current that flows between the source and the drain of the p-type MOS transistor 103 decreases, and the voltage drop of the p-type MOS transistor 103 decreases. In this case, the gate voltage of the p-type MOS transistor 104 rises and the gate-source voltage Vgs of the p-type MOS transistor 104 decreases, and therefore current that flows between the source and the drain of the p-type MOS transistor 104 decreases.

When current that flows between the source and the drain of the p-type MOS transistor 104 decreases, current that flows through the first resistor R1 decreases, and the voltage drop generated at the first resistor R1 decreases. Therefore, the voltage at point A rises, and the output voltage of the VROUT terminal also rises.

In this way, the output voltage Vout of the VROUT terminal is constant at "Vref−Vgs+Iref×R1," since the current feedback unit FS feeds back the current.

As described above, the LDO regulator 100 of the first embodiment according to the present technology has a current feedback unit FS in which constant current 2Iref is fed back. Furthermore, the control element 102, the p-type MOS transistor 103, and the pMOS-type transistor 104 configure a current turnback circuit FC, so that current substantially the same as the reference current Iref in the circuit flows through the control element 102 and the first resistor R1.

Therefore, a voltage required for the LDO regulator 100 to be operated stably is the gate-source voltage Vgs of the control element 102, and the overdrive voltage Vod of the p-type MOS transistor 103 or the p-type MOS transistor 104. Accordingly, it is possible with the LDO regulator 100 of the first embodiment according to the present technology to realize lowering of the voltage by one stage of the overdrive voltage Vod than in a conventional case. Furthermore, since the LDO regulator 100 causes the current feedback unit FS to feed back the current, the response speed to the load fluctuation is also improved as compared with a conventional voltage feedback type LDO regulator.

3. Second Embodiment (Example 2 of Power Supply Circuit)

Next, a power supply circuit of the second embodiment according to the present technology is a power supply circuit including a current feedback unit, in which the current feedback unit has two p-type MOS transistors, a control element, and a first resistor, the two p-type MOS transistors and the control element configure a current turnback circuit that turns back the current, current substantially the same as the reference current in the circuit flows through the control element and the first resistor, and the output voltage is determined at least depending on the first resistor and the reference current. The power supply circuit of the second embodiment is a power supply circuit further including a bias generating unit, in which the control element is configured with an n-type MOS transistor, the bias generating unit has an element substantially the same as the control element, and a second resistor, and the output voltage satisfies the following Expression (2), where the second resistor is denoted by R2, and the input voltage Vref is expressed as Iref×R2+Vgs.

[Expression 5]

$$Vout = Iref \times (R1 + R2) \tag{2}$$

It is possible with the power supply circuit of the second embodiment according to the present technology to further achieve lowering of the output voltage of the power supply circuit since the bias generating unit has an element substantially the same as the control element, and to prevent variation in the output voltage and achieve constant voltage since it does not depend on the gate-source voltage Vgs of the control element.

Figure 2:
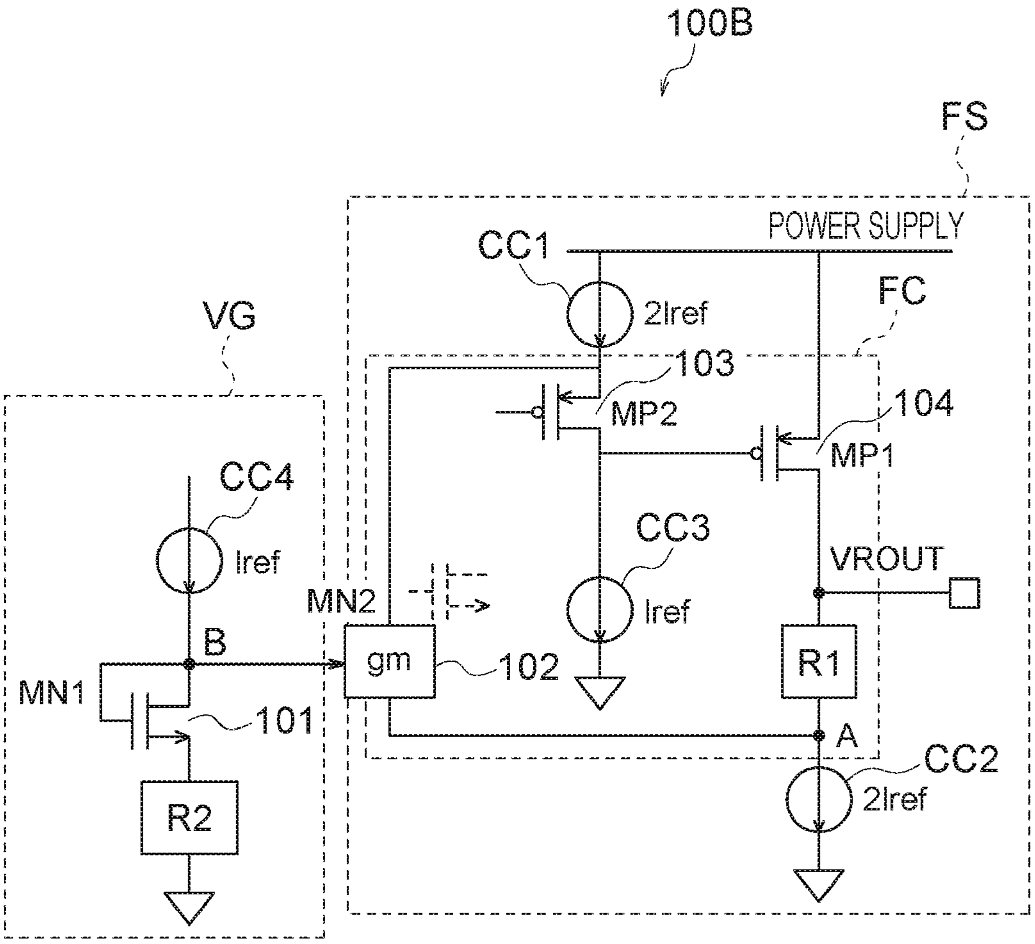
FIG. 2 is a block diagram illustrating an example of the configuration of an LDO regulator that is an example of a power supply circuit of a second embodiment according to the present technology.

FIG. 2 illustrates an LDO regulator 100B that is an example of a power supply circuit of the second embodiment according to the present technology. FIG. 2 is a block diagram illustrating a configuration example of the LDO regulator 100B to which the present technology is applied. Note that the same components as those in the first embodiment are designated by the same reference numerals, and the description thereof will be omitted as appropriate.

The LDO regulator 100B of the second embodiment according to the present technology includes a bias generating unit VG, a control element 102 is configured with an n-type MOS transistor, and the bias generating unit VG has a constant current source CC4, an element substantially the same as the control element (n-type MOS transistor) 102, and a second resistor R2.

When "Iref×R2+Vgs" is applied to the input voltage Vref (point B) to the gate of the control element (n-type MOS transistor) 102, the output voltage Vout can satisfy the following Expression (2). Note that it is assumed that the bias generating unit VG has an n-type MOS transistor 101 that is an element substantially the same as the control element (n-type MOS transistor) 102.

[Expression 6]

$$Vout = Iref \times (R1 + R2) \tag{2}$$

Note that the substantially same element has the substantially same, or the same, transistor characteristics as the control element (n-type MOS transistor) 102. Furthermore, to be substantially the same means that, for example, the characteristics of the gate-source voltage Vgs of the transistor and the drain current Id accord within a predetermined range. Note that the transistor characteristics can also be determined from the size of the transistor.

The constant current source CC4 is designed to flow constant current 1Iref, and configures a current mirror circuit together with a constant current source CC3. The n-type MOS transistor 101 is configured to have the same size as the control element (n-type MOS transistor) 102, so that the gate-source voltage Vgs of the n-type MOS transistor 101 and the gate-source voltage Vgs of the control element (n-type MOS transistor) 102 can be the same voltage Vgs.

Then, when the n-type MOS transistor 101 is configured with an element substantially the same as the control element 102 (n-type MOS transistor) so that the input voltage Vref (point B) to the gate of the control element (n-type MOS transistor) 102 is "Iref×R2+Vgs," the output voltage Vout of a VROUT terminal becomes "Iref×(R1+R2)" (constant) since the gate-source voltage Vgs of the control element (n-type MOS transistor) 102 is canceled from "Vref−Vgs+Iref×R1."

According to the power supply circuit of the second embodiment according to the present technology, the n-type MOS transistor 101 is used for the bias generating unit VG in the LDO regulator 100B so that "Iref×(R1+R2)," which is a constant output voltage, can be obtained without depending on the gate-source voltage Vgs of the control element (n-type MOS transistor) 102.

In particular, without being affected by variation in Vgs of the control element (n-type MOS transistor) 102, a stable constant voltage can be outputted from the VROUT terminal.

4. Third Embodiment (Example 3 of Power Supply Circuit)

A power supply circuit of the third embodiment according to the present technology is a power supply circuit in which at least one of the first resistor or the second resistor is configured with a variable resistor in the second embodiment. Furthermore, a power supply circuit of the third embodiment according to the present technology may have a differential circuit in the current feedback unit.

It is possible with a power supply circuit of the third embodiment according to the present technology to configure at least one of the first resistor or the second resistor with a variable resistor. Furthermore, a power supply circuit of the third embodiment according to the present technology can also configure a differential circuit in the current feedback unit. Note that the same configurations as those of the power supply circuit of the second embodiment are designated by the same reference numerals, and the description thereof will be omitted as appropriate.

Figure 3:
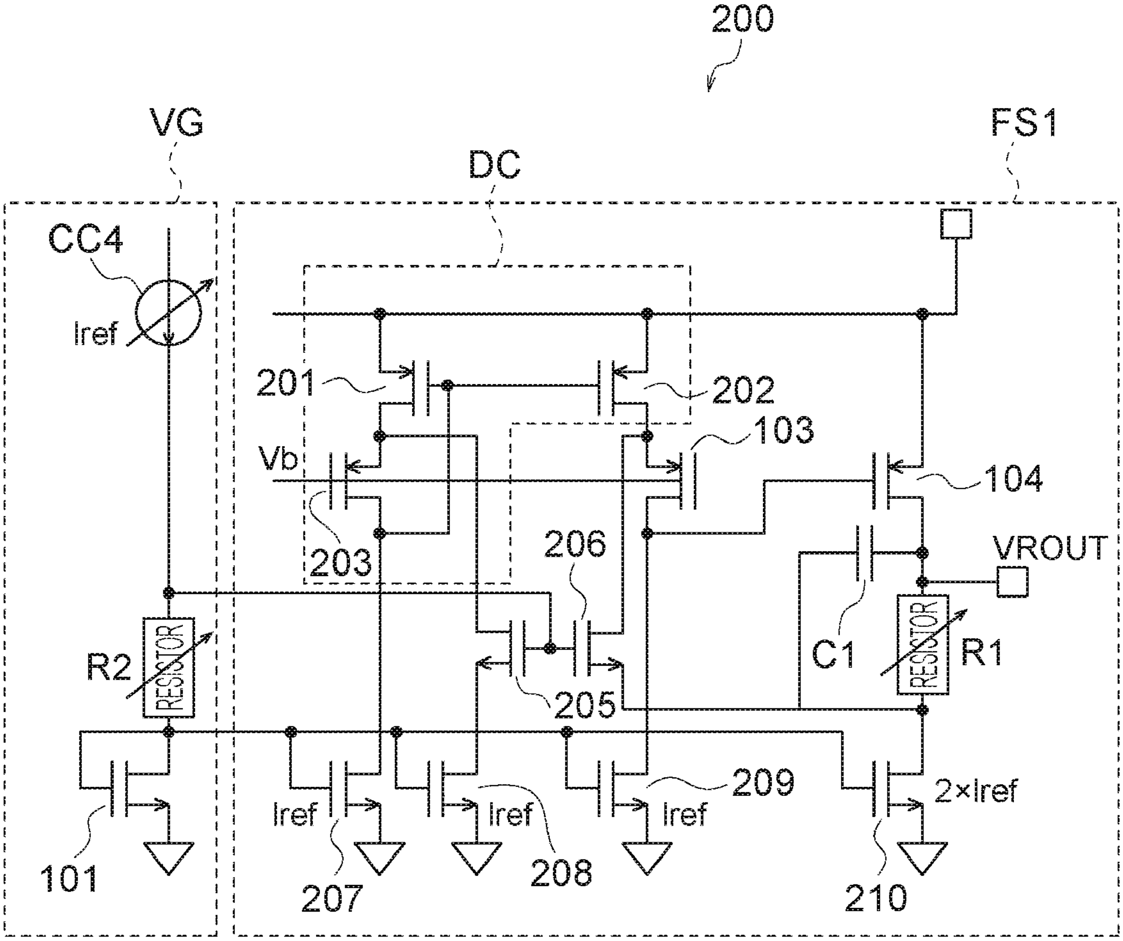
FIG. 3 is a block diagram illustrating an example of the configuration of an LDO regulator that is an example of a power supply circuit of a third embodiment according to the present technology.

FIG. 3 illustrates an LDO regulator 200 that is an example of a power supply circuit of the third embodiment according to the present technology. FIG. 3 is a block diagram illustrating the LDO regulator 200 of the third embodiment to which the present technology is applied.

As illustrated in FIG. 3, a current feedback unit FS1 of the LDO regulator 200 of the third embodiment according to the present technology further includes a capacitor C1, a differential circuit DC, an n-type MOS transistor 205, an n-type MOS transistor 206, an n-type MOS transistor 207, an n-type MOS transistor 208, an n-type MOS transistor 209, and an n-type MOS transistor 210 in the current feedback unit FS of the LDO regulator 100B of the second embodiment. The differential circuit DC is configured with a p-type MOS transistor 201, a p-type MOS transistor 202, and a p-type MOS transistor 203. Furthermore, regarding the current feedback unit FS1 of the LDO regulator 200, it is possible to configure at least one of a first resistor R1 or a second resistor R2 with a variable resistor, and FIG. 3 illustrates a case where both of the first resistor R1 and the second resistor R2 are configured with variable resistors.

Regarding the LDO regulator 200 of the third embodiment according to the present technology, the output voltage Vout from a VROUT terminal can be changed by configuring at least one of the first resistor R1 or the second resistor R2 with a variable resistor while the reference current Iref is fixed. In the case of this circuit configuration, note that the output voltage Vout from the VROUT terminal of the LDO regulator 200 is "Iref×(R1+R2)" (constant).

Note that the reference current Iref that flows through a constant current source CC4 may be made variable while the resistance values of the first resistor R1 and the second resistor R2 are fixed.

Furthermore, the LDO regulator 200 of the third embodiment according to the present technology includes the differential circuit DC in the current feedback unit FS1. In FIG. 3, the p-type MOS transistor 201, the p-type MOS transistor 202, and the p-type MOS transistor 203 are further provided in the current feedback unit FS of the LDO regulator 100B illustrated in FIG. 2.

In the differential circuit DC, the p-type MOS transistor 201 and the p-type MOS transistor 202 configure a current mirror circuit and are connected so that output current from the current mirror circuit is inputted to the source of the p-type MOS transistor 103.

Furthermore, the gate of the p-type MOS transistor 201 that configures the current mirror circuit is connected with the drain of the p-type MOS transistor 203. Furthermore, the drain of the p-type MOS transistor 203 is connected with the drain of the n-type MOS transistor 207.

The n-type MOS transistor 207, the n-type MOS transistor 208, and the n-type MOS transistor 209 configure a current mirror circuit together with the n-type MOS transistor 101, and reference current Iref flows. Furthermore, the n-type MOS transistor 210 configures a current mirror circuit together with the n-type MOS transistor 101, and is configured so that current twice as much as the reference current Iref flows.

The n-type MOS transistor 205 and the n-type MOS transistor 206 are replacement for the control element 102 in order to differentiate the current feedback unit FS1. Furthermore, the capacitor C1 is connected in parallel with the first resistor R1. Note that the capacitor C1 is arbitrarily provided in order to obtain desired characteristics.

It is possible with a power supply circuit of the third embodiment according to the present technology to configure at least one of the first resistor R1 or the second resistor R2 with a variable resistor. Furthermore, in a power supply circuit of the third embodiment according to the present technology, it is also possible to configure a differential circuit DC in the current feedback unit FS1.

The LDO regulator 200 of the third embodiment according to the present technology can amplify the difference in the input voltage of the n-type MOS transistor 101 by configuring the differential circuit DC in the current feedback unit FS1. In this case, the in-phase component is removed and the noise component can be removed, and therefore the noise immunity can be improved. Furthermore, by operating at a low voltage, the rise or fall of the amplitude become faster, and speeding up of the signals can be achieved.

5. Fourth Embodiment (Example 4 of Power Supply Circuit)

A power supply circuit of the fourth embodiment according to the present technology is a power supply circuit in which current that flows through the control element flows through the first resistor in the third embodiment.

According to a power supply circuit of the fourth embodiment according to the present technology, the output voltage can be determined from current that flows through the control element flowing through the first resistor, and therefore a desired output voltage can be outputted. Note that the same configurations as those of the power supply circuit of the third embodiment are designated by the same reference numerals, and the description thereof will be omitted as appropriate.

Figure 4:
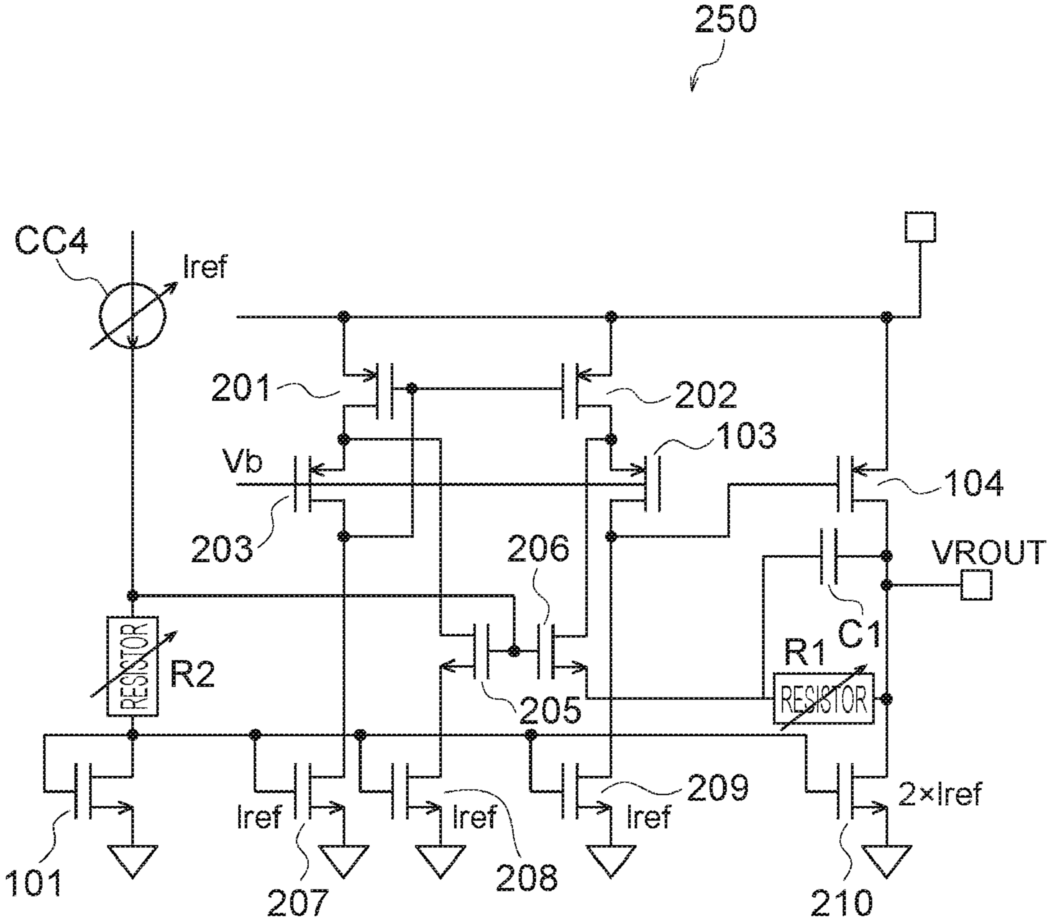
FIG. 4 is a block diagram illustrating an example of the configuration of an LDO regulator that is an example of a power supply circuit of a fourth embodiment according to the present technology.

FIG. 4 illustrates an LDO regulator illustrating an example of a power supply circuit of the fourth embodiment according to the present technology. FIG. 4 is a block diagram illustrating an LDO regulator 250 of the fourth embodiment to which the present technology is applied.

As illustrated in FIG. 4, the LDO regulator 250 of the fourth embodiment according to the present technology is obtained by changing the position of the first resistor R1 of the LDO regulator 200 illustrated in FIG. 3. In this case, current that flows from the source of an n-type MOS transistor 206 (control element 102) flows through a first resistor R1, and the output voltage Vout from a VROUT terminal of the LDO regulator 250 is "Iref×(R2−R1)" (constant).

According to a power supply circuit of the fourth embodiment according to the present technology, the position of the first resistor R1 can cause current that flows through the control element 102 (n-type MOS transistor 206) to flow through the first resistor R1, and a desired output voltage can be outputted.

6. Fifth Embodiment (Example 5 of Power Supply Circuit)

A power supply circuit of the fifth embodiment according to the present technology is a power supply circuit in which the output voltage is determined from the resistance value of the second resistor in a case where the resistance value of the first resistor is extremely smaller than the resistance value of the second resistor in the third embodiment.

According to a power supply circuit of the fifth embodiment according to the present technology, the resistance value of the first resistor is regarded as "0" and the output voltage can be determined only from the resistance value of the second resistor in a case where the resistance value of the first resistor is extremely smaller than the resistance value of the second resistor. Note that the same configurations as those of the power supply circuit of the third embodiment are designated by the same reference numerals, and the description thereof will be omitted as appropriate.

Figure 5:
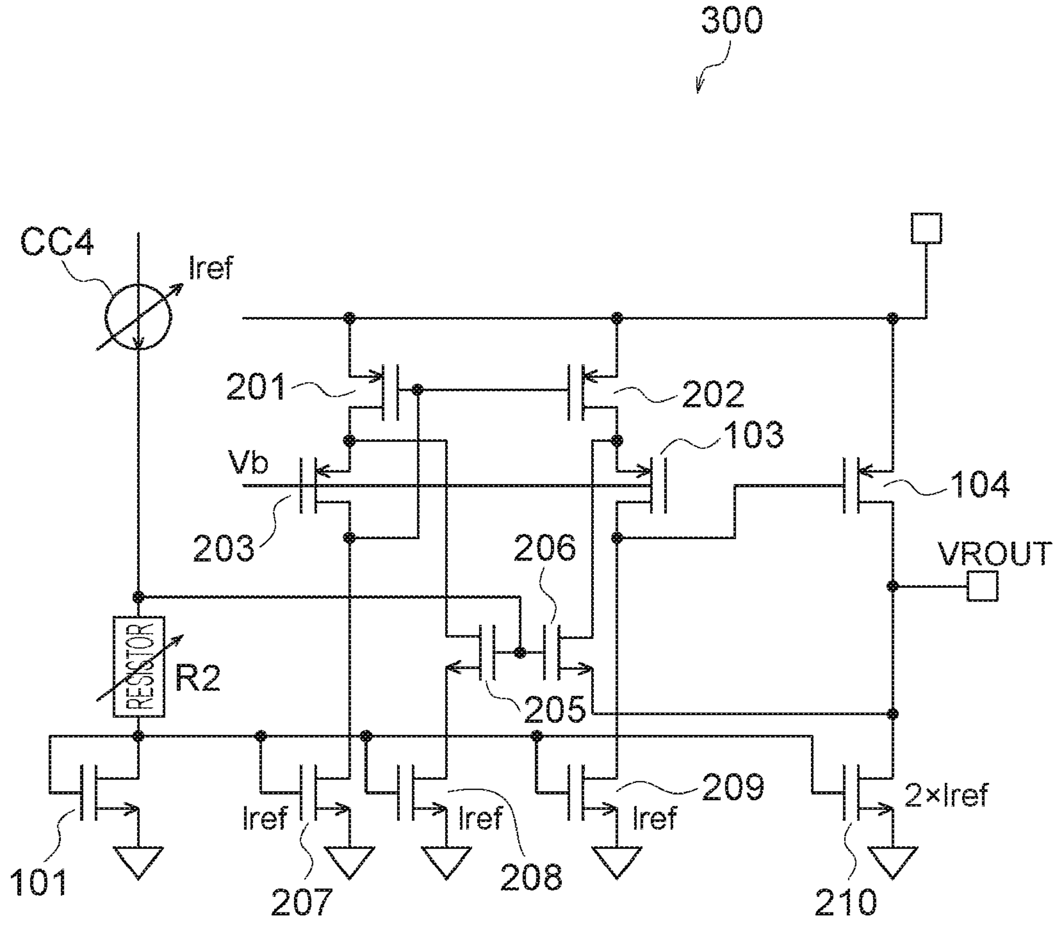
FIG. 5 is a block diagram illustrating an example of the configuration of an LDO regulator that is an example of a power supply circuit of a fifth embodiment according to the present technology.

FIG. 5 illustrates an LDO regulator illustrating an example of a power supply circuit of the fifth embodiment according to the present technology. FIG. 5 is a block diagram illustrating an LDO regulator 300 of the fourth embodiment to which the present technology is applied.

As illustrated in FIG. 5, in the LDO regulator 300 of the fifth embodiment according to the present technology, the first resistor R1 and the capacitor C1 are eliminated from the LDO regulator 200 illustrated in FIG. 3. In a case where the resistance value of the first resistor R1 is extremely smaller than the resistance value of the second resistor R2, the LDO regulator 300 can regard the resistance value of the first resistor R1 as "0" and connect the source of an n-type MOS transistor 206 with a VROUT terminal and the drain of an n-type MOS transistor 210. In this case, the output voltage Vout of the VROUT terminal is "Iref×R2" (constant).

According to the power supply circuit of the fifth embodiment according to the present technology, the output voltage Vout of the VROUT terminal can be determined from the reference current Iref and the second resistor R2 and a desired output voltage can be outputted in a case where the resistance value of the first resistor R1 is extremely smaller than the resistance value of the second resistor R2.

7. Sixth Embodiment (Example 6 of Power Supply Circuit)

A power supply circuit of the sixth embodiment according to the present technology is a power supply circuit having at least two first resistors and having at least two output voltages depending on the positions of the respective first resistors in the first to fifth embodiments.

The power supply circuit of the sixth embodiment differs from the power supply circuits of the first to fifth embodiments in that it has at least two first resistors. Therefore, the power supply circuit of the sixth embodiment has at least two output voltages. Note that the same configurations as those in the first to fifth embodiments are designated by the same reference numerals, and the description thereof will be omitted as appropriate.

Figure 6:
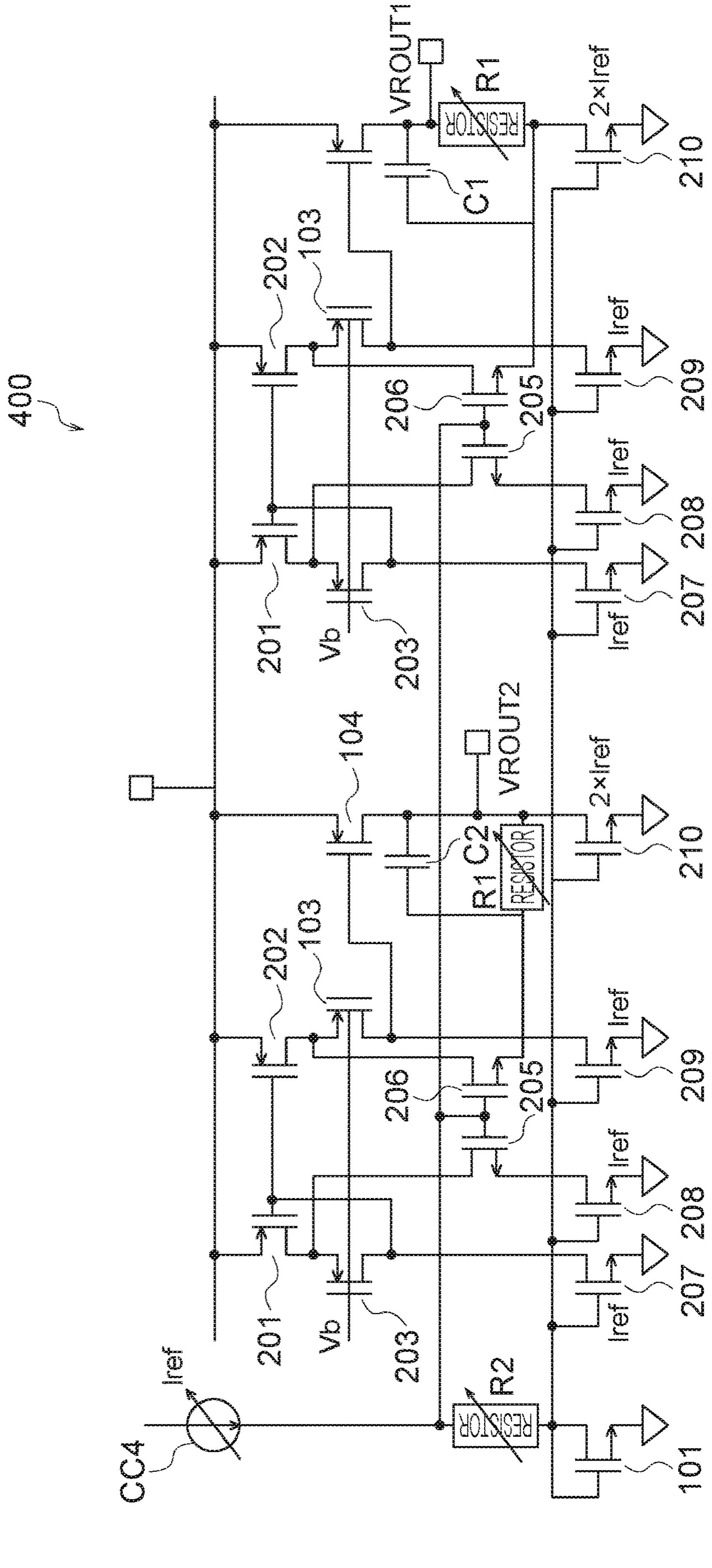
FIG. 6 is a block diagram illustrating an example of the configuration of an LDO regulator that is an example of a power supply circuit of a sixth embodiment according to the present technology.

FIG. 6 illustrates an LDO regulator 400 illustrating an example of a power supply circuit of the sixth embodiment according to the present technology. FIG. 6 is a block diagram illustrating the configuration of the LDO regulator 400 of the sixth embodiment to which the present technology is applied. Furthermore, in FIG. 6, "upper" means "upper" in FIG. 6, and "lower" means "lower" in FIG. 6.

As illustrated in FIG. 6, the LDO regulator 400 of the fifth embodiment according to the present technology includes the LDO regulator 200 illustrated in FIG. 3 and the LDO regulator 250 illustrated in FIG. 4.

Specifically, the upper side in FIG. 6 illustrates the same configuration as the LDO regulator 200 illustrated in FIG. 3, and the lower side in FIG. 6 illustrates the same configuration as the LDO regulator 250 illustrated in FIG. 4.

The LDO regulator 400 is configured to output "Iref×(R1+R2)" as the output voltage from a VROUT1 terminal, and output "Iref×(R2−R1)" as the output voltage from a VROUT2 terminal.

A power supply circuit of the sixth embodiment according to the present technology can have at least two first resistors, and can have at least two output voltages depending on the positions of the respective first resistors. In this case, it is possible to have two different output voltages by combining the power supply circuit of the second embodiment and the power supply circuit of the third embodiment.

8. Seventh Embodiment (Example 7 of Power Supply Circuit)

A power supply circuit of the seventh embodiment according to the present technology is a power supply circuit in which the bias generating unit in the third embodiment further includes a copy source current source, and current of the copy source current source serves as the reference current.

According to the power supply circuit of the seventh embodiment according to the present technology, the bias generating unit further has a copy source current source that is a copy source of the reference current, so that the reference current Iref of the current mirror circuit can be accurately copied.

When designing an n-type MOS transistor in a current mirror circuit, it is generally desirable to increase the output resistance seen from the drain. Furthermore, an n-type MOS transistor 101 is designed to have the same size in order to cancel the gate-source voltage Vgs of an n-type MOS transistor 206, and it is generally desirable to design a large transconductance (gm) as a differential input. Thus, by separately providing a circuit for Vref generation and a circuit for the current mirror circuit, optimization can be achieved respectively for the n-type MOS transistors. Note that the same configurations as those of the power supply circuit of the third embodiment are designated by the same reference numerals, and the description thereof will be omitted as appropriate.

Figure 7:
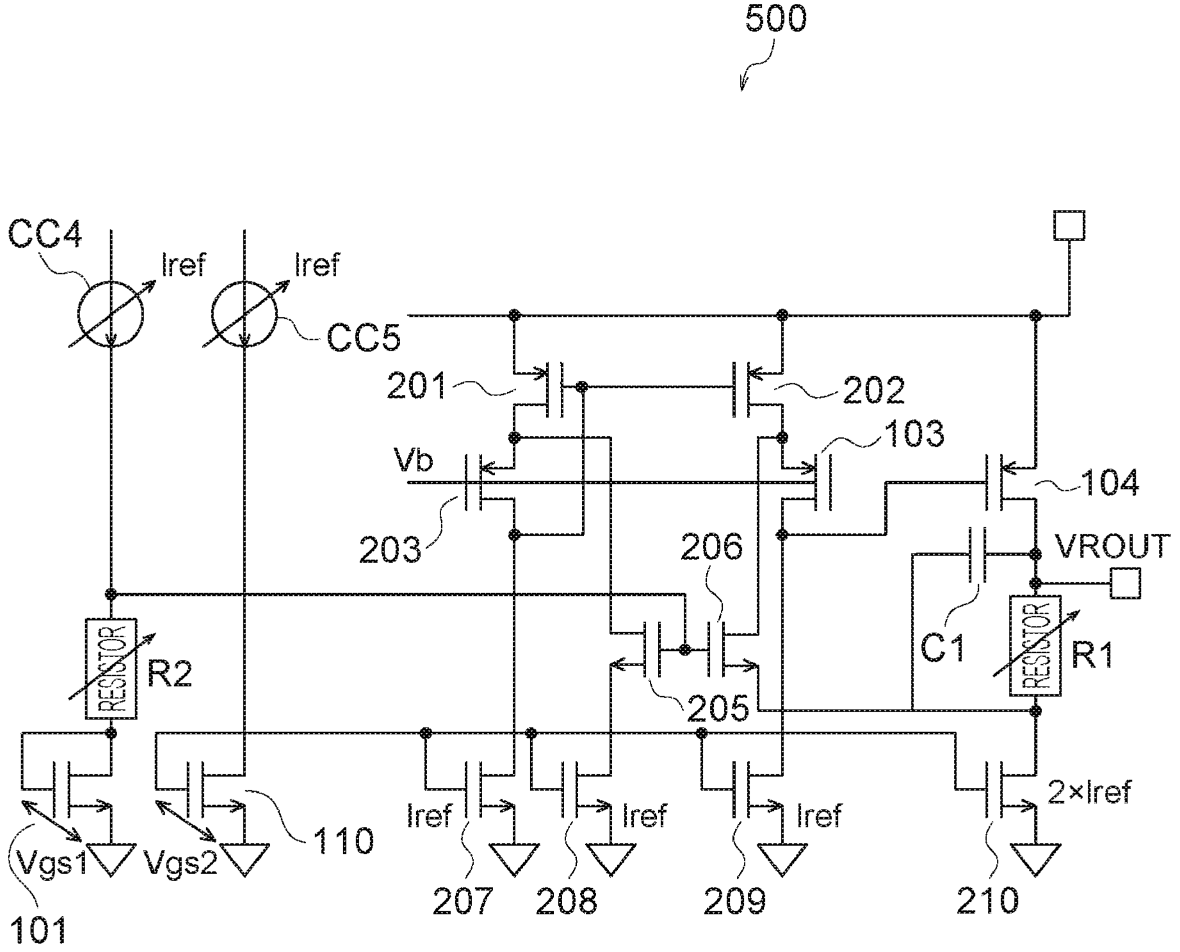
FIG. 7 is a block diagram illustrating an example of the configuration of an LDO regulator that is an example of a power supply circuit of a seventh embodiment according to the present technology.

FIG. 7 illustrates an LDO regulator that illustrates an example of the power supply circuit of the seventh embodiment according to the present technology. FIG. 7 is a block diagram illustrating an LDO regulator 500 of the seventh embodiment to which the present technology is applied.

As illustrated in FIG. 7, the LDO regulator 500 of the seventh embodiment according to the present technology further includes a copy source current source CC5 and an n-type MOS transistor 110 in the LDO regulator 200 illustrated in FIG. 3. Therefore, an n-type MOS transistor 207, an n-type MOS transistor 208, an n-type MOS transistor 209, and an n-type MOS transistor 210 can respectively achieve optimization for the gate-source voltage Vgs2 of the n-type MOS transistor 110. Furthermore, the n-type MOS transistor 101 can achieve optimization of the gate-source voltage Vgs1 for an n-type MOS transistor 205 and the n-type MOS transistor 206. In this case, note that the output voltage Vout from a VROUT terminal of the LDO regulator 500 does not change from "Iref×(R1+R2)."

Since the power supply circuit of the seventh embodiment according to the present technology further has the copy source current source CC5, the reference current Iref of the current mirror circuit can be accurately copied.

9. Eighth Embodiment (Transmitting Device)

A transmitting device of the eighth embodiment according to the present technology is a transmitting device, in which a power supply circuit is installed, the power supply circuit includes a current feedback unit, the current feedback unit has two p-type MOS transistors, a control element, and a first resistor, the two p-type MOS transistors and the control element configure a current turnback circuit that turns back the current, current substantially the same as the reference current in the circuit flows through the control element and the first resistor, and the output voltage is determined at least depending on the first resistor and the reference current.

In the transmitting device of the eighth embodiment according to the present technology, the output voltage value is calculated at least from, for example, the product of the resistance value of the first resistor and the current value of the reference current. The transmitting device according to the eighth embodiment of the present technology is a transmitting device in which the output voltage satisfies the following Expression (1), where the reference current is denoted by Iref, the gate-source voltage of the control element is denoted by Vgs, the first resistor is denoted by R1, and the input voltage to the control element is denoted by Vref.

[Expression 7]

$$Vout = Vref - Vgs + Iref \times R1 \quad (1)$$

Furthermore, the transmitting device of the eighth embodiment according to the present technology may be a transmitting device in which a power supply circuit according to any one of the first to seventh embodiments according to the present technology is installed.

Figure 8:
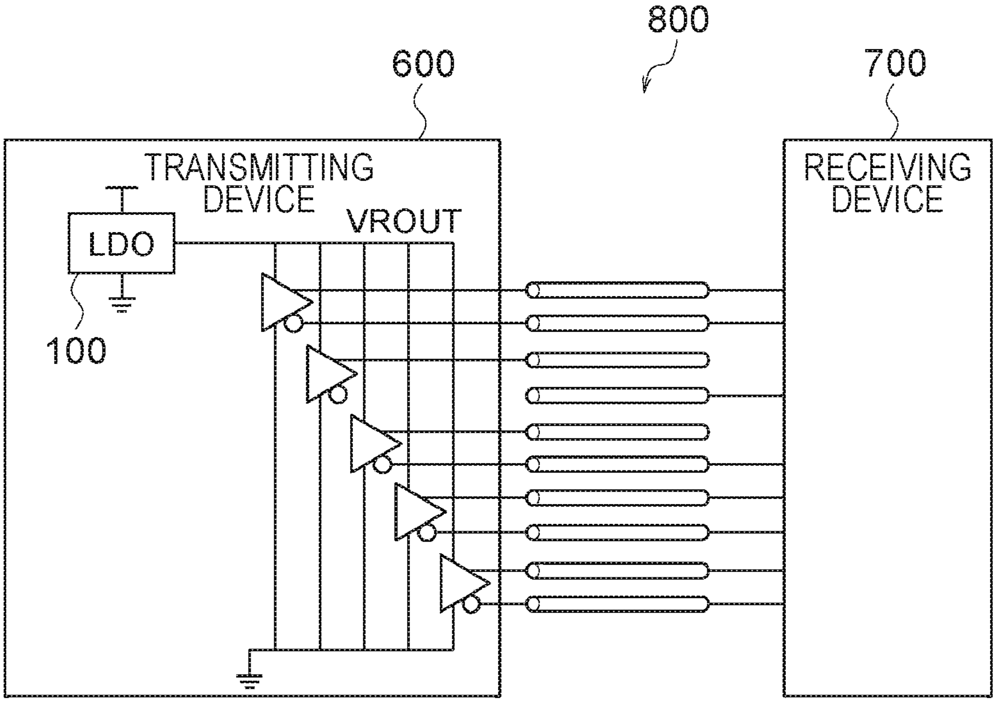
FIG. 8 is a diagram illustrating a configuration example in which a transmitting device that uses a power supply circuit of an eighth embodiment according to the present technology is used in a transmission system.

FIG. 8 is a diagram illustrating a usage example of a power supply circuit according to any one of the first to seventh embodiments according to the present technology as a transmitting device 600.

The above-described power supply circuits of the first to seventh embodiments can be used for the transmitting device 600 as illustrated in FIG. 8. That is, the transmitting device 600 is used in a transmission system 800. The transmission system 800 includes the transmitting device 600 having a power supply circuit according to any one of the first to seventh embodiments, and a receiving device 700.

The transmitting device 600 is configured with an imaging device having an imaging function such as a digital camera or a mobile phone, for example, and has, for example, an LDO regulator 100 and an imaging unit (not shown). The transmitting device 600 transmits pixel data captured by the imaging unit, for example, to the receiving device 700 via the LDO regulator 100.

The receiving device 700 is configured with a digital signal processor (DSP), a field programable gate array (FPGA), or the like, for example, and receives pixel data transmitted from the transmitting device 600 at a receiving unit (not shown). Then, the receiving device 700 outputs the received pixel data to an image processing unit (not shown).

In the transmitting device 600, the LDO regulator 100 is installed, the LDO regulator 100 (see FIG. 1) includes a current feedback unit FS, and the current feedback unit FS has two p-type MOS transistors 103 and 104, a control element 102, and a first resistor R1. In the transmitting device, the two p-type MOS transistors 103 and 104 and the control element 102 configure a current turnback circuit FC that turns back the current, current substantially the same as the reference current in the circuit flows through the control element 102 and the first resistor, and the output voltage is determined at least depending on the first resistor and the reference current. In the transmitting device of the eighth embodiment according to the present technology, the output voltage value is calculated at least from, for example, the product of the resistance value of the first resistor and the current value of the reference current.

In the transmitting device according to the eighth embodiment of the present technology, the output voltage satisfies the following Expression (1), where the reference current is denoted by Iref, the gate-source voltage of the control element 102 is denoted by Vgs, the first resistor is denoted by R1, and the input voltage to the control element 102 is denoted by Vref.

[Expression 8]

$$Vout = Vref - Vgs + Iref \times R1 \quad (1)$$

Since the transmitting device 600 of the eighth embodiment according to the present technology has a power supply circuit of any one of the first to seventh embodiments described above, it is possible to achieve lowering of power supply voltage and to achieve reduction of power consumption of the transmitting device 600.

Note that embodiments according to the present technology are not limited to the above-described embodiments, and various modifications can be made without departing from the gist of the present technology.

Furthermore, the first to eighth embodiments according to the present technology are not limited to the above-described embodiments, and various modifications can be made without departing from the gist of the present technology.

Furthermore, the effects described in the present specification are merely examples and are not limited, and other effects may be obtained.

Furthermore, the present technology may have the following configurations.

[1] A power supply circuit including a current feedback unit, in which the current feedback unit has two p-type MOS transistors, a control element, and a first resistor, the two p-type MOS transistors and the control element configure a current turnback circuit that turns back the current, current substantially the same as the reference current in the circuit flows through the control element and the first resistor, and the output voltage is determined at least depending on the first resistor and the reference current.

[2] The power supply circuit according to [1], in which the output voltage value is calculated at least from the product of the resistance value of the first resistor and the current value of the reference current.

[3] The power supply circuit according to [1] or [2], in which output voltage satisfies the following Expression (1), where the reference current is denoted by Iref, the gate-source voltage of the control element is denoted by Vgs, the first resistor is denoted by R1, and the input voltage to the control element is denoted by Vref.

(Expression 1)

$$Vout=Vref-Vgs+Iref\times R1 \quad (1)$$

[4] The power supply circuit according to any one of [1] to [3], including a bias generating unit, in which the control element is configured with an n-type MOS transistor, the bias generating unit has an element substantially the same as the control element, and a second resistor, and the output voltage satisfies the following Expression (2), where the second resistor is denoted by R2, and the input voltage Vref is expressed as Iref×R2+Vgs.

(Expression 2)

$$Vout=Iref\times(R1+R2) \quad (2)$$

[5] The power supply circuit according to [4], in which at least one of the first resistor or the second resistor is configured with a variable resistor.

[6] The power supply circuit according to [4] or [5], in which current that flows through the control element flows through the first resistor.

[7] The power supply circuit according to any one of [4] to [6], in which the output voltage is determined from the resistance value of the second resistor in a case where the resistance value of the first resistor is extremely smaller than the resistance value of the second resistor.

[8] The power supply circuit according to any one of [4] to [7], in which the bias generating unit further includes a copy source current source, and current of the copy source current source serves as the reference current.

[9] The power supply circuit according to any one of [1] to [8], having at least two first resistors, and having at least two output voltages depending on the positions of the respective first resistors.

[10] The power supply circuit according to any one of [1] to [9], in which the current feedback unit further has a differential circuit.

[11] A transmitting device, in which a power supply circuit is installed, the power supply circuit includes a current feedback unit, the current feedback unit has two p-type MOS transistors, a control element, and a first resistor, the two p-type MOS transistors and the control element configure a current turnback circuit that turns back the current, current substantially the same as the reference current in the circuit flows through the control element and the first resistor, and the output voltage is determined at least depending on the first resistor and the reference current.

[12] A transmitting device, in which the power supply circuit according to any one of [1] to [10] is installed.

REFERENCE SIGNS LIST

100, 100B, 200, 250, 300, 400, 500 LDO regulator
101 n-type MOS transistor
102 Control element (n-type MOS transistor)
103, 104 p-type MOS transistor
600 Transmitting device
Vout Output voltage
R1 First resistor
R2 Second resistor
DC Differential circuit
VG Bias generating unit
FS, FS1 Current feedback unit
FC Current turnback circuit

The invention claimed is:

1. A power supply circuit, comprising:
a current feedback unit, wherein the current feedback unit includes:
two p-type MOS transistors;
a control element; and
a first resistor, wherein
the two p-type MOS transistors and the control element configure a current turnback circuit that is configured to turn back current,
a current that flows through the control element and a current that flows through the first resistor are substantially the same as a reference current in a circuit, and
output voltage is determined at least based on the first resistor and the reference current.

2. The power supply circuit according to claim 1, wherein a value of the output voltage is calculated at least based on a product of a resistance value of the first resistor and a current value of the reference current.

3. The power supply circuit according to claim 1, wherein the output voltage satisfies following Expression (1), where the reference current is denoted by Iref, gate-source voltage of the control element is denoted by Vgs, the first resistor is denoted by R1, and input voltage to the control element is denoted by Vref

[Expression 1]

$$Vout=Vref-Vgs+Iref\times R1 \quad (1).$$

4. The power supply circuit according to claim 3, further comprising
a bias generating unit, wherein
the control element is configured with an n-type MOS transistor,
the bias generating unit comprises:
an element substantially the same as the control element; and
a second resistor, and
the output voltage satisfies following Expression (2), where the second resistor is denoted by R2, and the input voltage Vref is expressed as Iref×R2+Vgs

[Expression 2]

$$Vout=Iref\times(R1+R2) \quad (2).$$

5. The power supply circuit according to claim 4, wherein at least one of the first resistor or the second resistor is configured with a variable resistor.

6. The power supply circuit according to claim 4, wherein the current that flows through the control element flows through the first resistor.

7. The power supply circuit according to claim 4, wherein the output voltage is determined based on a resistance value of the second resistor in a case where a resistance value of the first resistor is extremely smaller than a resistance value of the second resistor.

8. The power supply circuit according to claim 4, wherein the bias generating unit further includes a copy source current source, and a current of the copy source current source serves as the reference current.

9. The power supply circuit according to claim 1, further comprising:

at least two resistors that include the first resistor and a second resistor; and at least two output voltages, wherein the at least two output voltages are determined based on positions of the first resistor and the second resistor.

10. The power supply circuit according to claim 1, wherein the current feedback unit further includes a differential circuit.

11. A transmitting device, comprising:

a power supply circuit, wherein the power supply circuit includes a current feedback unit, and the current feedback unit includes:

two p-type MOS transistors;

a control element; and a first resistor, wherein the two p-type MOS transistors and the control element configure a current turnback circuit that is configured to turn back current, a current that flows through the control element and a current that flows through the first resistor are substantially the same as a reference current in a circuit, and output voltage is determined at least based on the first resistor and the reference current.

12. A transmitting device, comprising:

a power supply circuit, wherein the power supply circuit includes:

a current feedback unit that includes:

two p-type MOS transistors;

a control element; and a first resistor, wherein the two p-type MOS transistors and the control element configure a current turnback circuit that is configured to turn back current, a current that flows through the control element and a current that flows through the first resistor are substantially the same as a reference current in a circuit, and output voltage is determined at least based on the first resistor and the reference current; and a bias generating unit that includes a copy source current source, wherein a current of the copy source current source serves as the reference current.

* * * * *